United States Patent
Pani et al.

(10) Patent No.: US 9,226,205 B2
(45) Date of Patent: Dec. 29, 2015

(54) MULTI-CELL WTRUS CONFIGURED TO PERFORM MOBILITY PROCEDURES AND METHODS

(75) Inventors: Diana Pani, Montreal (CA); Paul Marinier, Brossard (CA); Benoit Pelletier, Roxboro (CA); Christopher R. Cave, Montreal (CA); Rocco DiGirolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1149 days.

(21) Appl. No.: 12/429,466

(22) Filed: Apr. 24, 2009

(65) Prior Publication Data

US 2009/0270103 A1 Oct. 29, 2009

Related U.S. Application Data

(60) Provisional application No. 61/048,128, filed on Apr. 25, 2008.

(51) Int. Cl.
 H04W 24/10 (2009.01)
 H04W 36/00 (2009.01)
 H04W 36/18 (2009.01)
 H04W 88/02 (2009.01)

(52) U.S. Cl.
 CPC .......... *H04W 36/0083* (2013.01); *H04W 36/18* (2013.01); *H04W 88/02* (2013.01)

(58) Field of Classification Search
 USPC .......... 370/328, 329–352; 455/423, 434, 509, 455/442
 See application file for complete search history.

(56) References Cited

U.S. PATENT DOCUMENTS

| | | | | |
|---|---|---|---|---|
| 6,804,214 | B1 * | 10/2004 | Lundh et al. | 370/335 |
| 7,299,048 | B2 * | 11/2007 | Lim et al. | 455/442 |
| 7,706,846 | B2 | 4/2010 | Moon | |
| 7,986,238 | B2 * | 7/2011 | Cho | 340/572.1 |
| 8,019,334 | B2 * | 9/2011 | Koskela et al. | 455/423 |
| 8,036,702 | B2 * | 10/2011 | Etemad | 455/553.1 |
| 2003/0016642 | A1 | 1/2003 | Nakayasu | |
| 2004/0137927 | A1 * | 7/2004 | Mun | 455/509 |
| 2005/0176426 | A1 * | 8/2005 | Roberts | 455/434 |
| 2005/0288028 | A1 * | 12/2005 | Lim et al. | 455/442 |

(Continued)

FOREIGN PATENT DOCUMENTS

| | | |
|---|---|---|
| CN | 1640158 A | 7/2005 |
| JP | H11355829 A | 12/1999 |

(Continued)

OTHER PUBLICATIONS

Ericson et al., "Introduction of Dual-Cell HSDPA Operation on Adjacent Carriers", 3GPP TSG-RAN WG1#54bis Meeting, R1-084031, (Prague, Czech Republic, Sep. 29-Oct. 3, 2008).

(Continued)

*Primary Examiner* — Curtis A Alia
*Assistant Examiner* — Emmanuel Maglo
(74) *Attorney, Agent, or Firm* — Condo Roccia Koptiw LLP

(57) ABSTRACT

Dual-cell or multi-cell Wireless Transmit Receive Units (WTRUS) configured to implement mobility procedures are described. The WTRU configurations implement methods to optimize and allow mobility for the procedures of cell search and cell reselection, measurement reporting and inter-frequency handovers, compressed mode measurements, and soft handovers.

32 Claims, 5 Drawing Sheets

(56) References Cited

U.S. PATENT DOCUMENTS

| | | | |
|---|---|---|---|
| 2006/0153128 A1 | 7/2006 | Frederiksen et al. | |
| 2006/0274712 A1* | 12/2006 | Malladi et al. | 370/345 |
| 2007/0066301 A1* | 3/2007 | Roberts | 455/434 |
| 2007/0224992 A1* | 9/2007 | Dalsgaard et al. | 455/436 |
| 2008/0004034 A1 | 1/2008 | Takata et al. | |
| 2008/0112353 A1* | 5/2008 | Ljung et al. | 370/315 |
| 2008/0290951 A1 | 11/2008 | Inoue et al. | |
| 2008/0299985 A1* | 12/2008 | Yang et al. | 455/452.2 |
| 2009/0093280 A1* | 4/2009 | Kitazoe | 455/574 |
| 2009/0116468 A1* | 5/2009 | Zhang et al. | 370/342 |
| 2009/0163204 A1* | 6/2009 | Farnsworth et al. | 455/434 |
| 2009/0190550 A1* | 7/2009 | Giustina et al. | 370/331 |
| 2009/0196197 A1* | 8/2009 | DiGirolamo et al. | 370/252 |
| 2009/0201884 A1* | 8/2009 | Chaponniere | 370/332 |
| 2009/0203376 A1* | 8/2009 | Sambhwani et al. | 455/434 |
| 2009/0221320 A1* | 9/2009 | Walley et al. | 455/552.1 |
| 2009/0245178 A1* | 10/2009 | Gholmieh et al. | 370/328 |
| 2009/0258647 A1* | 10/2009 | Yamada et al. | 455/435.1 |
| 2009/0264130 A1* | 10/2009 | Catovic et al. | 455/436 |
| 2009/0312056 A1* | 12/2009 | Drugge et al. | 455/561 |
| 2010/0080192 A1* | 4/2010 | Dong et al. | 370/332 |

FOREIGN PATENT DOCUMENTS

| | | |
|---|---|---|
| JP | 2003-032724 | 1/2003 |
| JP | 2006-279635 A | 10/2006 |
| JP | 2007-097122 | 4/2007 |
| JP | 2008-016968 | 1/2008 |
| JP | 2008-294158 | 12/2008 |
| WO | WO 02/37875 A1 | 5/2002 |
| WO | 2006/105307 | 10/2006 |
| WO | 2006/125149 | 11/2006 |
| WO | WO 2006-116102 A2 | 11/2006 |
| WO | WO 2006/125149 A2 | 11/2006 |
| WO | WO 2008-023332 A2 | 2/2008 |
| WO | WO 2008-040448 A1 | 4/2008 |

OTHER PUBLICATIONS

Huawei, "Introduction of Dual-Cell HSDPA Operation on Adjacent Carriers", 3GPP TSG-RAN WG1#54bis Meeting, R1-084690, (Prague, Czech Republic, Sep. 29-Oct. 3, 2008).

Qualcomm Europe et al., "Mullti-Carrier Evolution", 3GPP TSG-RAN #42 Meeting, RP-081114, (Prague, Czech Republic, Dec. 2-5, 2008).

Qualcomm Europe, et al., "Feasibility Study on Dual-Cell HSDPA Operation", 3GPP TSG-RAN #39 Meeting, RP-080148, (Puerto Vallarta, Mexico, Mar. 4-7, 2008).

Qualcomm Europe, et al., "Feasibility Study on Dual-Cell HSDPA Operation", 3GPP TSG-RAN #39 Meeting, RP-080228, (Puerto Vallarta, Mexico, Mar. 4-7, 2008).

Third Generation Partnership Project, "Technical Specification Group Radio Access Network; Physical Layer Procedures (FDD) (Release 8)", 3GPP TS 25.214 V8.1.0 (Mar. 2008).

Third Generation Partnership Project, "Technical Specification Group Radio Access Network; User Equipment (UE) Prodcedures for Cell Reselection in Connected Mode (Release 8)", 3GPP TS 25.304 V8.5.0 (Mar. 2009).

Third Generation Partnership Project, "Technical Specification Group Radio Access Network; User Equipment (UE) Prodcedures in Idle Mode and Procedures for Cell Reselection in Connected Mode (Release 8)", 3GPP TS 25.304 V8.1.0 (Mar. 2008).

Third Generation Partnership Project, "Technical Specification Group Radio Access Network; Radio Resource Control (RRC); Protocol Specification (Release 8)", 3GPP TS 25.331 V8.2.0 (Mar. 2008).

Third Generation Partnership Project, "Technical Specification Group Radio Access Network; Radio Resource Control (RRC); Protocol Specification (Release 8)", 3GPP TS 25.331 V8.6.0 (Mar. 2009).

Qualcomm Europe, "Dual Carrier Operation for CELL_DCH," 3GPP TSG-RAN WG1 #52bis, R1-081438 (Mar. 31-Apr. 4, 2008).

Third Generation Partnership Project, "3rd Generation Partnership Project; Technical Specification Group Radio Access Network; Physical Layer aspects for evolved Universal Terrestrial Radio Access (UTRA) (Release 7)", 3GPP TS 25.814 V7.1.0 (Sep. 2006).

Third Generation Partnership Project, "Technical Specification Group Radio Access Network; User Equipment (UE) Procedures in Idle Mode and Procedures for Cell Reselection in Connected Mode (Release 8)", 3GPP TS 25.304 V8.5.0 (Mar. 2009).

Third Generation Partnership Project, "Technical Specification Group Radio Access Network; Evolved Universal Terrestrial (E-UTRA) and Evolved Universal Terrestrial Radio Access Network (E-UTRAN); Overall Description; Stage 2 (Release 8)," 3GPP TS 36.300 V8.4.0 (Mar. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.8.0 (Mar. 2009).

3rd Generation Partnership Project (3GPP), R1-081437, "Dual Carrier HSDPA Assumptions and Standards Impact", Qualcomm Europe, 3GPP TSG RAN WG1 #52bis, Shenzhen, China, Mar. 31-Apr. 4, 2008, 6 pages.

3rd Generation Partnership Project (3GPP), R1-081545, "Considerations on Dual-Cell HSDPA Operation", Ericsson, 3GPP TSG RAN WG1 Meeting #52bis, Shenzhen, China, Mar. 31-Apr. 4, 2008, 2 pages.

3rd Generation Partnership Project (3GPP), R2-081899, "Dual Cell HSDPA Operation Consideration", Huawei, 3GPP TSG RAN WG#61bis, Shenzhen, China, Mar. 31-Apr. 4, 2008, 2 pages.

3rd Generation Partnership Project )3GPP), R1-081438, "Dual Carrier operation for CELL_DCH", Qualcomm Europe, 3GPP TSG RAN WG1 #52bis, Shenzhen, China, Mar. 31-Apr. 4, 2008, 5 pages.

* cited by examiner

MULTI-CELL WTRUS CONFIGURED TO PERFORM MOBILITY PROCEDURES AND METHODS

CROSS REFERENCE TO RELATED APPLICATIONS

This application claims the benefit of U.S. provisional application No. 61/048,128, filed on Apr. 25, 2008, which is incorporated by reference as if fully set forth.

FIELD OF INVENTION

This application is related to wireless communication apparatus and methods.

BACKGROUND

As part of the on-going evolution of the third Generation Partnership Project (3GPP) Wideband Code Division Multiple Access (WCDMA) standard, Dual-Cell High-Speed Downlink Packet Access (HSDPA) (DC-HSDPA) has been approved in 3GPP. Dual-cell HSDPA is a natural evolution of High Speed Packet Access (HSPA) which allows the use of a second HSPA carrier (i.e. two 5 MHz downlink carriers) to create a bigger downlink data pipe.

The DC-HSDPA operation is backward compatible with Release 7, 6, and 5, and Release 99 devices through seamless interoperation between single-carrier and dual-carrier coverage areas. Dual-cell operation provides both throughput increase and latency reduction. Most importantly, more wireless transmit receive units (WTRUs) have access to higher data rates, especially in poor radio conditions where techniques such as Multiple Input Multiple Output (MIMO) are not used. In terms of system performance, Dual-Cell HSDPA offers efficient load balancing across carriers and some capacity gain.

The agreed dual-cell operation in Release 8 of the 3GPP standard only applies to the downlink, with the uplink (UL) transmission restricted to a single cell, i.e. carrier. Furthermore, the following additional restrictions have been imposed: the two downlink cells belong to the same Node-B and are on adjacent carriers (and by extension the carriers are in the same frequency band); and the two downlink cells cover the same geographical area (sector). Accordingly, a dual-cell capable WTRU communicates configured to receive two downlink carriers (an anchor carrier and a supplementary carrier), and to transmit one uplink anchor carrier. The downlink anchor carrier is matched with the uplink anchor carrier.

With respect to mobility, the WTRU bases all its mobility decisions on the anchor cell. Since the supplementary carrier is restricted in Release 8 to be adjacent to the anchor carrier, the pathloss between the two cells and the WTRU is similar. Therefore, it was decided that there was no need for the perform mobility procedures based on the supplementary carrier.

As the scope of dual-cell operation is expanded in future WCDMA releases or in other wireless systems, for example, to non-adjacent frequencies or across frequency bands, mobility procedures (e.g., measurement reporting) and others procedures will be impacted. Therefore, there exists a need for an improved method and apparatus for dual cell operation.

SUMMARY

Dual-cell or multi-cell Wireless Transmit Receive Units (WTRUs) configured to implement mobility procedures are described. The WTRU configurations implement methods to optimize and allow mobility for the procedures of cell search and cell reselection, measurement reporting and inter-frequency handovers, compressed mode measurements, and soft handovers.

BRIEF DESCRIPTION OF THE DRAWINGS

A more detailed understanding may be had from the following description, given by way of example in conjunction with the accompanying drawings.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

When referred to hereafter, the terminology "sector" includes but is not limited to one or more cells belonging to the same base station and covering the same geographical area. The terminology "Anchor Carrier" includes but is not limited to a downlink frequency carrier associated with an uplink frequency carrier assigned to a WTRU. The terminology "Supplementary Carrier" refers to a downlink frequency carrier which is not the Anchor Carrier. The terminology "dual cell" refers to the two HS-DSCH transmissions received by the WTRU. The physical realization of a "cell" depends on the context. For example, for WCDMA Release 8 the "cell" in dual cell refers to the two downlink carriers. However, in future releases and in other wireless systems, the term "cell" in dual-cell may refer to two sectors on the same carrier frequency.

When referred to hereafter, the terminology a "neighboring cell carrier" refers to one of the carriers supported within the same sector of the anchor cell, i.e. main cell, with which the WTRU may perform dual-cell operation.

Figure 1:
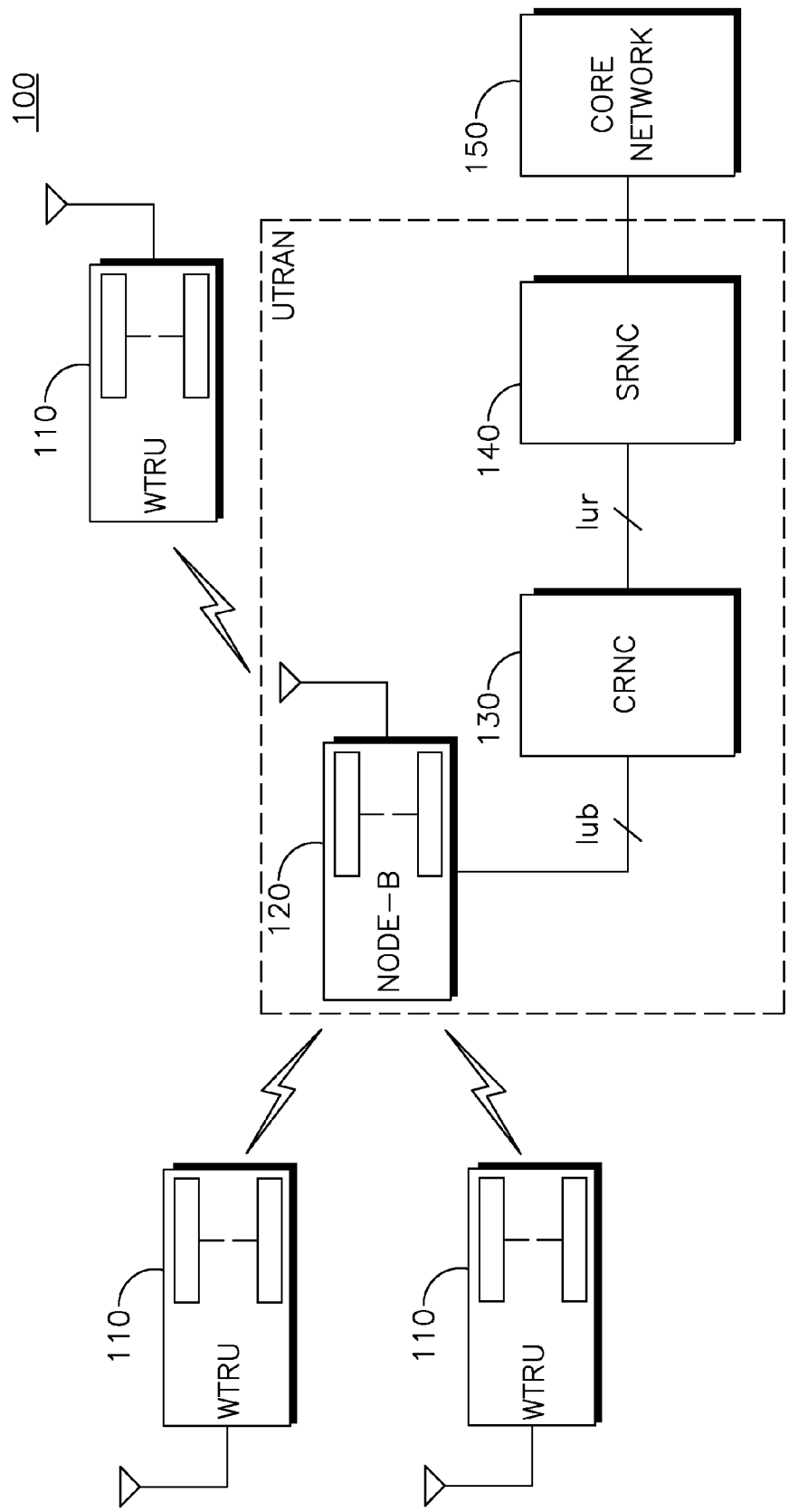
FIG. 1 is a diagram of an example wireless communication system.

FIG. 1 shows a wireless communication system 100 including a plurality of WTRUs 110, a Node-B 120, a controlling radio network controller (CRNC) 130, a serving radio network controller (SRNC) 140, and a core network 150. Node-B 120, CRNC 130 and SRNC 140 are collectively known as a Universal Terrestrial Radio Access Network (UTRAN) in 3GPP terminology.

As shown in FIG. 1, WTRUs 110 are in communication with the Node-B 120, which is in communication with CRNC 130 and SRNC 140. Although three WTRUs 110, one Node-B 120, one CRNC 130, and one SRNC 140 are shown in FIG. 1, any combination of wireless and wired devices may be included in wireless communication system 100.

Figure 2:
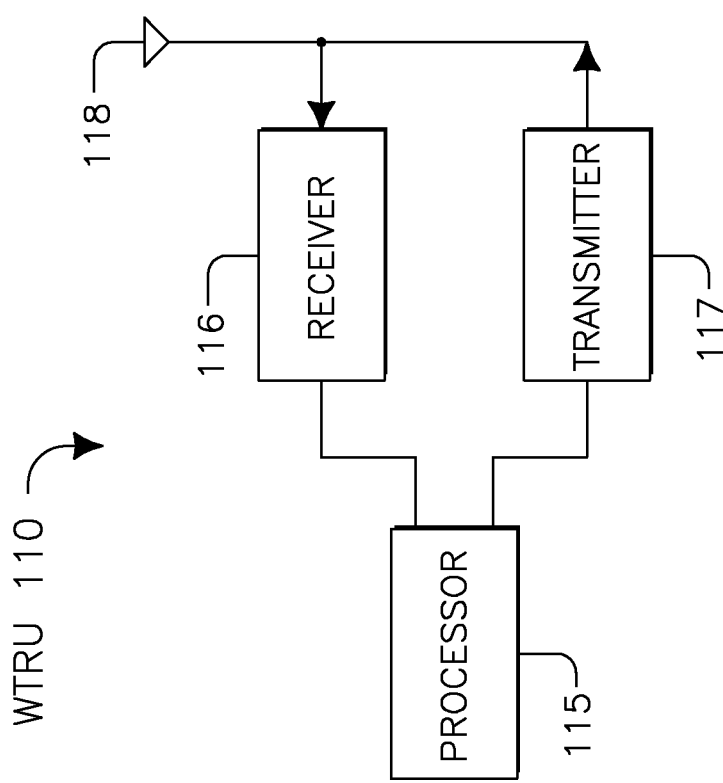
FIG. 2 is a diagram of a dual-cell operable Wireless Transmit Receive Unit (WTRU).

FIG. 2 is a functional block diagram 200 of a multi-cell capable WTRU 110 of wireless communication system 100 of FIG. 1. The WTRU 110 is configured to perform and enhance mobility procedures in, for example, a CELL Dedicated Channel (DCH) (CELL_DCH) state, or other states.

In addition to the components that may be found in a typical WTRU, a multi-cell WTRU 110 includes an antenna 118, for facilitating the transmission and reception of wireless data, a receiver 116 configured to receive multi-cell wireless signals, a processor 115 configured to implement mobility procedures for multi-cell operation and a transmitter 117. The receiver 116 may be a single receiver capable of receiving communications over two or more carriers, or a collection of receivers, such as receivers that are each capable of receiving communications over a single carrier.

The antenna 118 may comprise a single antenna or multiple antennas. One example configuration of a multiple receiver/multiple antenna embodiment is where each antenna is connected to its own receiver In the example configuration of FIG. 2, the receiver 116 and the transmitter 117 are in communication with the processor 115. The antenna 118 is in communication with both the receiver 116 and the transmitter 117 to facilitate the transmission and reception of wireless data.

The example WTRU 110 is configured to perform a public land mobile network (PLMN) search in non CELL_DCH state when WTRU 110 is switched on. The WTRU 110 may be configured to expedite PLMN selection by monitoring two or more carriers during the PLMN search. Accordingly, the WTRU 110 may be configured to use the antenna 118 and the receiver 116 to simultaneously scan two or more carriers during the PLMN search. For each carrier, the WTRU 110 may find a strongest cell. WTRU 110 may then decode the system information (SI) to identify the PLMN with which the cell is associated. Therefore, the WTRU 110 may be required to decode a broadcast control channel (BCCH) in both carriers. The WTRU 110 may then determine which PLMN to select based thereon.

The UTRAN may be configured to restrict WTRU 110 from camping and reselecting to a cell that the UTRAN prefers to use as a supplementary cell for the WTRU. The UTRAN, therefore, may be configured to assign priorities to the carriers, e.g. for dual-cell, an anchor cell may be provided with priority over a supplementary cell, or alternatively the supplementary carriers within the same sector may have a different priority assigned. The UTRAN may broadcast the carrier priority information via System Information Blocks (SIBs). The UTRAN may be configured to use a new Information Element (IE) "Carrier priority" or any existing IE for this purpose.

In the alternative, no priorities can be assigned to the carriers. For example, a dual-cell WTRU can be made aware that a cell is a supplementary cell by receiving a new broadcasted IE "Supplementary Cell" or the WTRU can be configured with an implicit priority between an anchor cell and supplementary cell such that the anchor carrier always has a higher priority than the supplementary carrier.

When the WTRU 110 is switched on and is performing an initial cell search, the WTRU 110 may not have any information regarding the cells. Accordingly, the WTRU 110 may scan all RF carriers within the frequency band allotted for the communication system 100. The WTRU 110 may be configured to take into account carrier priority when collecting information during the scan and,performing cell selection. Carrier priority may include, but is not limited to, a broadcasted new Information Element that informs the WTRU 110 of the priority, or an IE that indicates to the WTRU 110 whether a carrier is an anchor carrier or a supplementary carrier in a dual-cell embodiment.

The WTRU 110 may be configured to consider the measured cell as unsuitable, or alternatively, the whole carrier as a non-suitable carrier, if the WTRU 110 detects a supplementary carrier or a lowest priority carrier. The WTRU 110 may be configured to stop looking for a suitable cell on the carrier altogether if it determines the whole carrier is a non-suitable carrier and to move on to evaluate a next carrier. The WTRU 110 may then search for best cells in the carriers that have the highest carrier priority or that are anchor cells. In the case where no suitable cells are found in the highest priority cells, the WTRU 110 may search for lower priority carriers or supplementary carriers to camp on. If a suitable cell is found, the WTRU 110 may camp on the cell. This WTRU 110 may be configured to also use this method for cell reselection.

The WTRU 110 may be configured to periodically (at a pre-determined time or a time configured by the UTRAN) scan and search other higher priority within the same priority carrier when the WTRU 110 is camped on a lower priority carrier, or a supplementary carrier. The WTRU 110 may be configured to periodically search (i.e. during measurement occasions) cells when WTRU 110 is camped on the higher priority carrier. For example the WTRU may be configured to search within the same priority carrier and/or cells within other carriers with the same priority; to search lower priority carriers if the quality or received signal level of the current cell goes below a certain threshold, and no other cells on the same priority carriers meet the cell selection/reselection requirements; and/or to search lower priority carriers if the quality or received signal level of the cell goes below a certain threshold.

The WTRU 110 may be configured to use stored information, including carrier priority information, to restrict itself from taking measurements on lower priority in those carriers unless no other suitable cells are found in higher priority carriers. The carrier priority concept may also be used for a multi-carrier network deployment where different carriers may be assigned different priorities.

Figure 4:
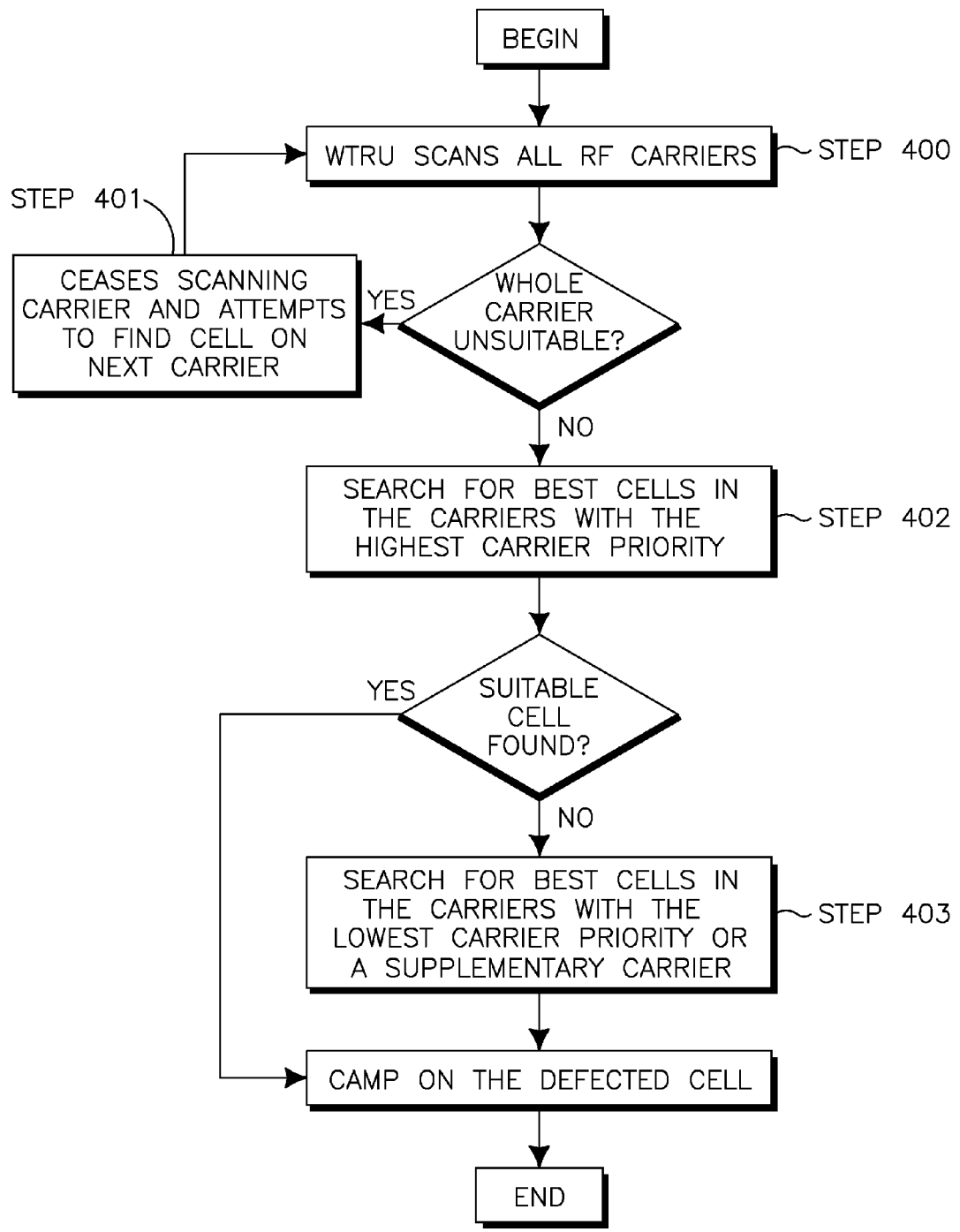
FIG. 4 is an example flow diagram of a method for restricting access to a cell using carrier priority.

An example flow diagram of a method used for restricting a WTRU using a carrier priority is illustrated in FIG. 4. A WTRU scans all RF carriers within a band to obtain information, including at least a carrier priority (step 400). If the carrier priority indicates that the entire carrier is unsuitable, the WTRU ceases scanning the carrier and attempts to find a suitable cell on the next carrier (step 401).

If suitable cells are detected, the WTRU may search for the best cells in the carriers with the highest carrier priority (step 402). Upon detection of a suitable cell in the highest carrier priority, the WTRU camps on the detected cell (Step 404). If the WTRU is unable to detect a suitable cell in the highest priority carrier, a search is performed for lower priority carriers, or supplementary carriers (step 403), wherein the WTRU camps on the best detected cell among the lower priority or supplementary carriers (step 404).

Legacy WTRUs may be allowed to camp or be connected to any carrier. In some scenarios, the UTRAN may be configured to restrict access of legacy WTRUs to supplementary carrier or to some of the supplementary carriers. Accordingly, the UTRAN may indicate the cell status as "barred" or "reserved for operator use" or "reserved for future extension". In addition, the UTRAN may extend this status to the entire, or the carrier frequency by setting an IE "Intra-frequency cell re-selection" to "not allowed". Alternatively, the UTRAN may not include these frequencies in the broadcasted neighbor cell list and accordingly the legacy WTRU may not consider them for selection or reselection.

Barring the cell, reserving the cell, or not including the frequency in the neighbor list, may restrict even multi-cell WTRUs 110 as well from camping/selecting/reselecting to this carrier. Accordingly, the multi-cell WTRUs 110 may be configured to ignore the barred/reserved indication if the cell/carrier is known to be a supplementary carrier or to have some type of lower priority. Alternatively, DC-HSDPA WTRUs may be configured to read a new IE, specific to barring/reserving DC-HSDPA WTRUs. If the cell is an anchor cell, or no other indication is available, a DC-HSDPA WTRU considers the broadcast cell status.

To address the future evolution, new measurement criteria and events are desired to allow a WTRU to perform inter-frequency handovers between the cells. Moreover, since the inter-frequency handover may occur within the cell, a smoother handover procedure with lower data losses is desired.

The WTRU may be configured to implement a method with respect to a Cell Forward Access Channel (CELL_FACH) state wherein a receiver that receives a second carrier takes Inter-frequency measurements while in the CELL_FACH state. The UTRAN may use a WTRU's capability for DC-HSDPA as an indication that the WTRU does not require FACH measurement occasions on an anchor or main carrier. The WTRU 110 may accordingly be configured with a main receiver that receives the main carrier and a supplementary receiver that receives a second or supplementary carrier and to decide to use supplementary receiver to make measurements during measurement occasions. Such a configuration may also have the flexibility of making measurements at other occasions. Where the Node-B of a UTRAN is made aware that a WTRU does not use the measurements occasions on the anchor or main carrier, the need for the Node-B to use discontinuous reception (DRX) during these periods is eliminated.

Figure 3:
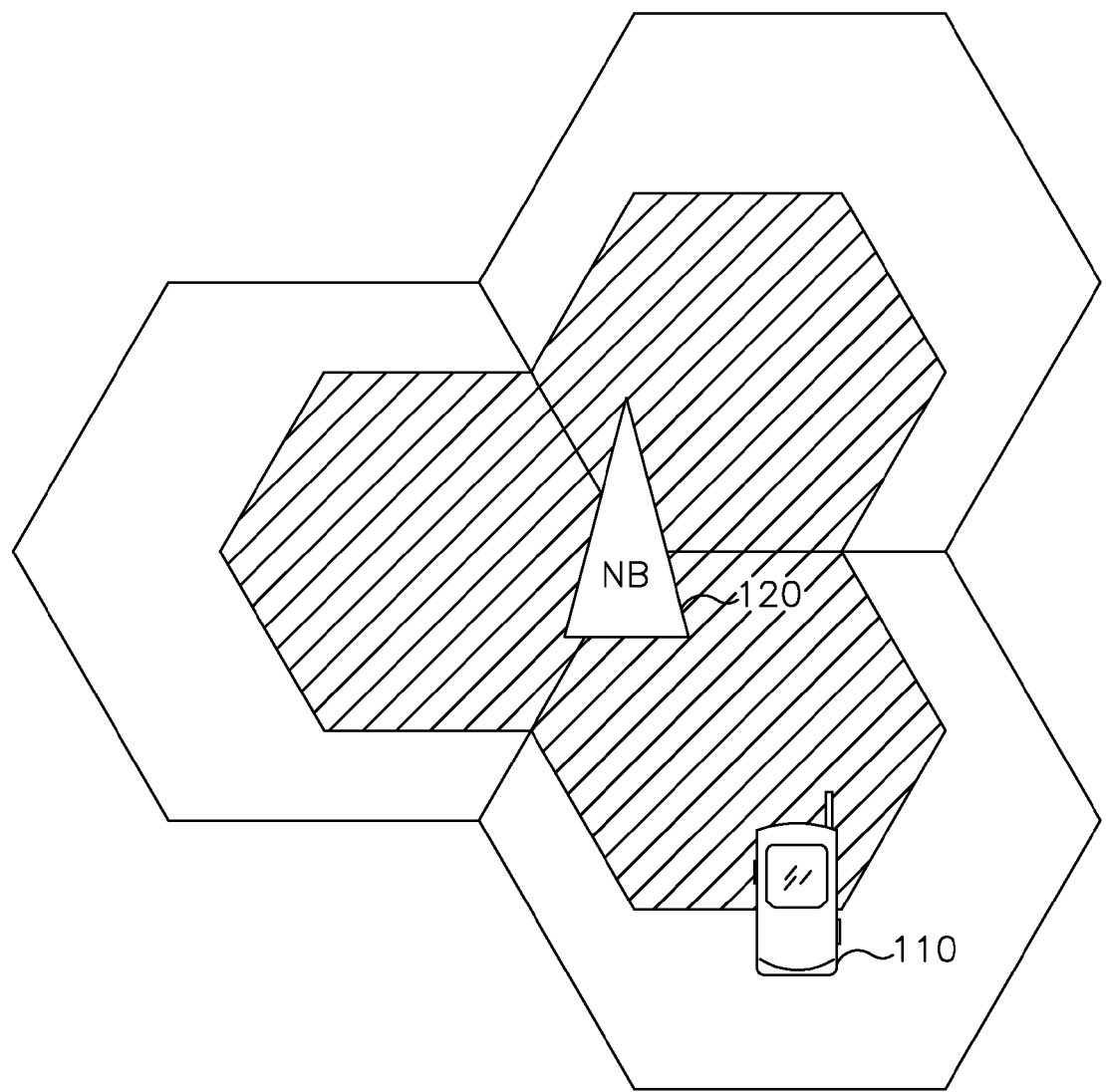
FIG. 3 is a diagram of a deployment with an anchor and a supplementary cells in carriers.

In CELL_DCH state, the WTRU 110 and the UTRAN may be configured to perform supplementary carrier handovers within the same sector or between cells in different sectors. Additionally, simultaneous anchor cell and supplementary cells handovers may be allowed. This may be performed by the UTRAN for load balancing scenarios or for hierarchical deployments, wherein one or more of the carriers within the same sector have different coverage areas. FIG. 3 shows an example of this deployment, where the anchor cell is in Carrier 1 and the supplementary cell is in Carrier 2. As seen from FIG. 3 the cells using Carrier 2 have a smaller coverage area than the cells using Carrier 1.

In a multi-carrier deployment WTRU 110 may be configured to periodically measure other carriers within the same sector, other than two carriers it may be connected on. Alternatively, WTRU 110 may be configured by the UTRAN to measure other carriers in the same cell. The UTRAN may be configured to use a Radio Resource Control (RRC) MEASUREMENT CONTROL message to transmit this configuration. The RRC measurement control message may also be extended to provide information on the carriers supported within the same sector. WTRU 110 may then be configured to use compressed mode measurement gaps to take measurements on these other carriers.

The WTRU 110 may further be configured to perform measurements on other carriers, periodically or if ordered by the UTRAN via a MEASUREMENT CONTROL message. Alternatively, the WTRU 110 may be configured to take measurements if a Common Pilot Channel (CPICH) signal quality, e.g. energy per chip to interference power density (Ec/No) and/or Received Signal Code Power (RSCP)), of at least one of the supplementary cell or anchor cell is below a threshold. This measuring may be performed while the anchor or supplementary cell is the best cell from a monitored set.

In order to allow supplementary carrier handovers or dual carrier handovers within the same cell, one or a combination of triggers may be configured for the WTRU 110. These triggers may include CPICH measurements indicating "neighboring cell carriers" are above a system configured threshold, CPICH measurement of a "neighboring cell carrier" is better than the supplementary carrier and/or anchor carrier, a "neighboring cell carrier" enters a reporting range which may be used by the UTRAN to perform a handover for load balancing purposes, a "neighboring cell carrier" leaves a reporting range, and/or CPICH measurement of the supplementary carrier has fallen below a system configured threshold. Each of these triggers may require that the event exists for a selected time duration. The WTRU 110 may be configured to transmit a measurement report when one of the above triggers occurs. The UTRAN may be configured to use such report to initiate a handover procedure.

The WTRU may be configured to generate Channel Quality Information (CQI) reports for all of the carriers that it receives. The UTRAN may be configured determine whether to release or temporarily disable a supplementary carrier based on received CQI report about the supplementary carrier. For example, if a selected amount of received CQI reports are below a predetermined value, the UTRAN may be configured to release or disable the supplementary carrier. If the UTRAN is aware that the supplementary carrier has a different coverage area than the anchor cell, the UTRAN may then redirect the WTRU 110 to another supplementary carrier that is under the same coverage area as the anchor cell. Alternatively, the UTRAN may maintain a connection with the anchor cell. In this situation, the UTRAN may also request a measurement report from WTRU 110 about other carriers.

In an alternative, a generated CQI value may be used by the WTRU 110 as an internal trigger to start measurements on other carriers, and to alternatively trigger a measurement report. The measurement report may report the quality of other carriers in the same sector, or neighboring sectors.

Alternatively, the WTRU 110 may be configured to monitor the number of failed downlink (DL) Media Access Control (MAC) Protocol Data Units (PDUs) (DL MAC PDUs), e.g. the number of PDUs that did not pass a CRC check. The WTRU 110 may perform a check for one or a combination of the following criteria on a supplementary cell: the number of failed DL MAC PDUs during a configured period of time and/or the number of consecutive failed DL MAC PDUs. Where these numbers exceed respective thresholds, they may serve as triggers for measurements on other carriers. The WTRU 110 may perform such check on the anchor or main cell alone, or in combination with one or more supplementary cells.

If any of the criteria is met, the WTRU 110 may be triggered to conduct measurements on other carriers, and/or the WTRU may be configured to send an indication to the UTRAN that the quality on a cell is below a threshold using a special value of the CQI which indicates that one of the above conditions has become true. Alternatively, the WTRU may be configured to indicate cell quality to the UTRAN by generating and sending an RRC measurement report that indicates the measurements on one or more carriers and/or a layer 2 (L2) message, e.g a special value of system information (SI) or in a MAC-i PDU payload using a special header field.

The UTRAN may then perform one of the actions described above regarding determining whether to release the supplemental carrier. The UTRAN may also monitor the number of received Negative Acknowledgements (NACKs)

(consecutive or during a period to time) to determine whether the quality on the supplementary cell is degrading and whether appropriate action should be taken.

Additionally, the WTRU 110 may be configured to report "neighboring cell carrier" measurements when performing intra-frequency and inter-frequency measurements. For example, if an event 1x, i.e. 1D used for serving cell change or any other measurements, is triggered, the WTRU 110 may be configured to report CPICH measurements of the "neighboring cell carriers" of the main cell that triggered the event. Such reporting allows the UTRAN to perform serving cell change to a dual-cell operation immediately.

When inter-frequency handover between carriers of the same sector in the same Node-B 120 occur, e.g. anchor carrier inter-frequency handovers, the connection with the supplementary carrier is maintained until the synchronization and physical channels are established in the new anchor cell. This avoids data loss and interruption of the services. In the case where a supplementary cell becomes the anchor or main cell, the WTRU 110 may acquire and establish new UL channels while continuing to receive the High Speed-Shared Control Channel (HS-SCCH) and High Speed-Physical Downlink Shared Channel (HS-PDSCH). Once the anchor cell is established, WTRU 110 may then establishes a new supplementary carrier if needed. If a supplementary carrier does not change, timing adjustments are performed with the timing and synchronization if the new anchor or main cell is significantly different.

When an anchor switching inter-frequency handover occurs, MAC-ehs/hs reset is preferably not performed. This minimizes data loss since the MAC-ehs is located in the same Node-B 120. However, since the anchor and/or supplementary cell are changing, the WTRU 110 may need to flush Hybrid Automatic Repeat Request (HARQ) processes. If the HARQ processes are carrier dependent, WTRU 110 may be configured to flush HARQ processes corresponding to the carrier that is being switched. Alternatively, if the HARQ processes are carrier independent, WTRU 110 may be configured to flush all HARQ processes as soon as reception from the new anchor cell is performed. In another alternative, only the HARQ processes known to be receiving data from the anchor cell are flushed.

When inter-frequency or inter-Radio Access Technology (RAT) measurements are performed, the UTRAN may configure the WTRU to perform compressed mode measurements. The WTRU may be configured to stops receiving in the operating frequency during these measurement gaps and to tune to other frequencies and RATs to take measurements. Accordingly, a method of compressed mode measurements is implemented by the multi-cell WTRU.

In accordance with this method, if compressed mode measurement gaps are configured by the UTRAN, and the WTRU 110 has a dual-receiver architecture, the WTRU 110 may be configured to apply these measurement gaps only to the supplementary carrier. Upon reception of a MEASUREMENT CONTROL message, where compressed mode activation/deactivation indications are received, the WTRU 110 implicitly knows that these gaps may be applicable only to the supplementary carrier. The receiver and transmitter used for the anchor carrier may be configured to performs continuous uplink (UL) transmission and downlink (DL) reception, while the receiver used for the supplementary carrier may be configured to be used, during measurement gaps, to measure other frequencies and/or RATs. Where the WTRU is configured for UL dual carrier operation, the method may also be applied.

In an alternative, the UTRAN may indicate to the WTRU 110 to which carrier the compressed mode measurement gaps are applied in a MEASUREMENT CONTROL message. The MEASUREMENT CONTROL message, therefore, is extended to provide the carrier frequency to which the measurement gaps are applied. The WTRU 110 may be configured to start performing measurements upon reception of this message during measurement gaps using the receiver for the indicated carrier.

In another alternative, the WTRU 110 may be configured to determine if only the anchor cell is configured to have the measurement gaps applied thereto and then applies the measurement gaps to the anchor cell. In still another alternative, both receivers may be configured to perform measurements using the same aligned measurement gaps provided in a MEASUREMENT CONTROL message. Both receivers may be configured to perform measurements in another alternative where the measurement gaps or offsets are configured differently for each carrier, such that data may be sent to WTRU 110 without any interruption, and WTRU 110 may continuously receive the data on one of the two carriers.

For WTRUs with a single receiver chain architecture, which may nonetheless be capable of multi-cell operations with adjacent carriers, or WTRUs not capable of measurements on one frequency while receiving on another, the measurement gap may be applied to both the anchor or main carrier and any supplementary carriers.

The WTRU measurement capability may be signaled to the UTRAN using layer 3 (L3) signaling using an existing or a new message. WTRU category may also be used to inform the UTRAN of such capabilities.

WTRUs configured for MIMO and/or dual-cell operation may be configured to implement the above methods.

As an alternative to compressed mode, when a WTRU is capable of dual-cell or multi-cell operation, interruption of the transmission on a supplementary carrier for a single continuous period of time may be performed, allowing fast inter-frequency measurements. Such configuration is possible since synchronization on supplementary carriers may not be required as long as the WTRU is synchronized to the anchor or main carrier. The benefit is a faster discovery of suitable cells on other frequencies than that of the anchor or supplementary carriers.

For fast inter-frequency measurements, the UTRAN may configure the WTRU 110 to perform the inter-frequency measurements for a certain period of time Such time period can be defined, for example, by a start time and stop time, or a start time and duration. A measurement command may include a list of carriers, and may also include a list of cells, to measure on each frequency. The duration may be pre-defined, pre-signaled through RRC signaling, for example on system information, or signaled at the time the measurement is commanded through RRC signaling or lower layer signaling, Medium Access Control (MAC) or Physical (PHY) layer signaling. The duration may also implicitly be derived by the WTRU 110 from the number of cells included in the measurement command.

A start time and a duration may also be signaled through RRC, MAC or physical layer signaling. The UTRAN may be configured to refrain from transmitting any data on the supplementary carrier during the configured inter-frequency measurement period. During this period, the WTRU 110 may be configured to measure the specified cells on the configured frequencies, or searches the new cell on the configured frequencies. The WTRU 110 may then reports the measurement results after the end of the measurement period.

Alternatively, WTRU 110 may be configured to autonomously determine when to make inter-frequency measurements based on the information contained in the MEASUREMENT CONTROL and to then signals to the UTRAN that the WTRU needs a Discontinuous Reception (DRX) period on the supplementary carrier in order to make the measurements. During this time, the Node-B continues transmission on the anchor carrier, but refrains from transmitting on the supplementary carrier. The WTRU signaling information may be transmitted by sending a special reserved value of CQI, e.g., the values of 0 or 31. Alternatively, a new CQI table may be provided for the supplementary carrier with special reserved CQI entries. The termination of the measurement period may be signaled by transmitting a non-reserved value of CQI, or, sending a new RRC message, or lower layer signaling (MAC or PHY) signal, on the anchor carrier.

Figure 5:
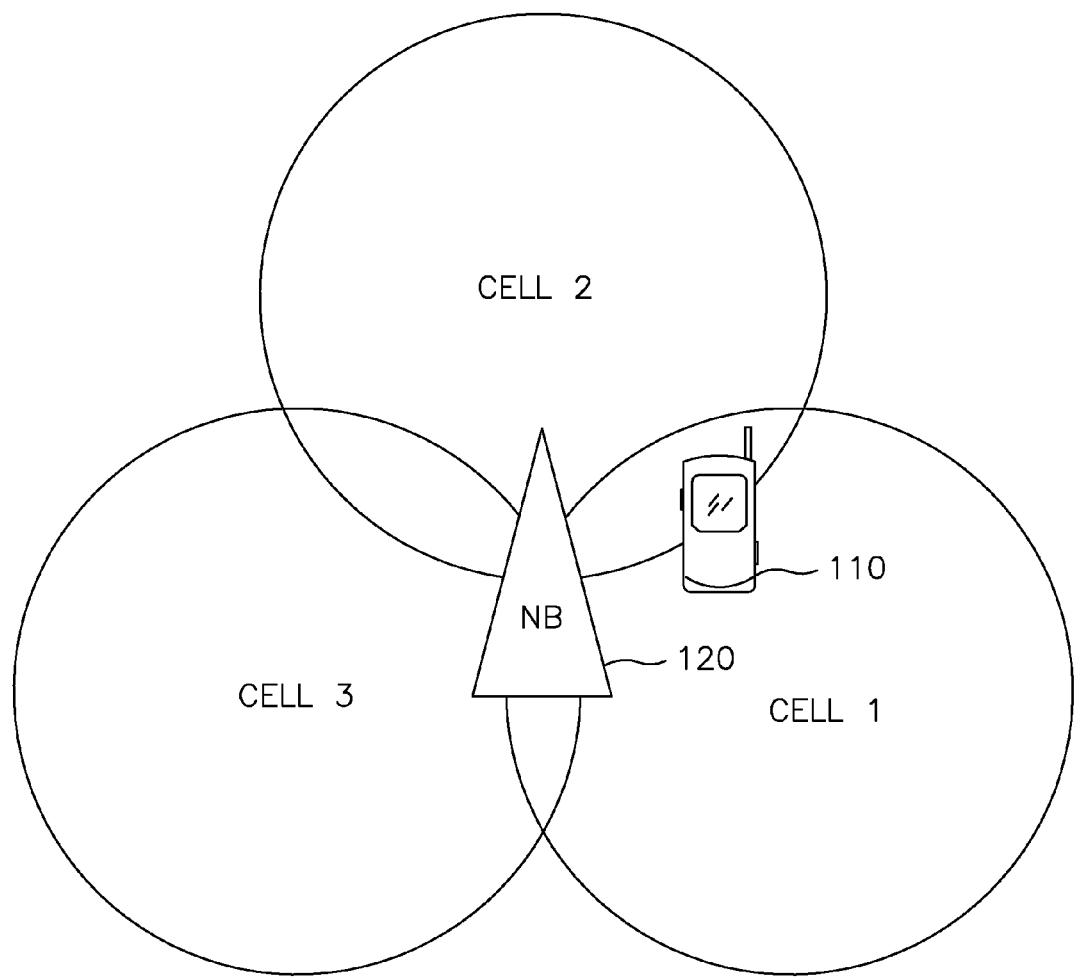
FIG. 5 is a diagram of dual-cell operation in the same carrier frequency.

In an alternate dual-cell implementation, the WTRU 110 may be configured to perform dual-cell HSDPA operation with cells in the same Node-B in the same carrier. FIG. 5 shows an example of this deployment. As shown in FIG. 5, an anchor cell refers to the serving cell of the given carrier, and the supplementary cell refers to the sector belonging to the same Node-B as the serving cell in the same carrier. In the example shown in FIG. 3, the anchor cell is in sector 1 and the supplementary cell is sector 2.

The WTRU 110 may therefore be configured to operate in dual-cell mode with cells belonging to the same sector in different carriers, or alternatively, as described above, with cells belonging to two different sectors in the same Node-B 120 and in the same carrier frequency. The UTRAN provides the WTRU 110 with the configuration for same frequency dual-cell operation. The WTRU 110 may be configured to determine that dual-cell operation in the same carrier is configured based on the fact that the frequency info is the same for both cells configured.

In order for the UTRAN to be able to change the supplementary cell from one cell to another within the same carrier and Node-B, a new measurement event is defined that reports if the quality of the supplementary cell fell below a threshold for a configured amount of time, Such a report may be used by the UTRAN to disable the reported supplementary carrier. Another method used by the UTRAN to change the supplementary cell uses a new measurement event that is defined to report whether the quality of a neighboring cell is better than the supplementary cell by a certain amount for a predetermined amount of time. Also, a new measurement event may be defined to report if the quality of a neighboring cell is above a configured threshold for a configured amount of time. Such reporting may be used by the UTRAN to configure the reported cell as a supplementary cell.

Alternatively, the UTRAN may be configured to determine whether to release or temporarily disable the supplementary cell according to the CQI reports received from WTRU 110. If a configured amount of CQI reports are below a configured value, the UTRAN releases/or disables the supplementary cell. In another alternative, a new reserved value of the CQI is used to indicate to the Node-B that the quality of the supplementary cell is below a threshold and/or that a new sector has a better value. A special value of system information (SI) may also be sent or the control information may be embedded in a MAC-i PDU. Any one of the above methods, alone or in combination with each other, may be used by the UTRAN to determine whether to change a supplementary cell.

The operation of the HS-SCCH is similar to dual-cell carrier operation in Release 8, wherein two different HS-SCCHs may be sent over the two cells, using different scrambling code and different High Speed Downlink Shared Channel (HS-DSCH) Radio Network Temporary Identity (H-RNTI). In one method, the same H-RNTI may be allocated for both cells and the WTRU 110 may be configured to monitor for only one H-RNTI. This requires the CRNC 130 to reserve the H-RNTI on the neighboring sectors or cells in case the WTRU 110 operates in a dual-cell mode.

The UL High Speed Dedicated Physical Control Channel (HS-DPCCH) feedback channel is sent over two channelization codes, or the format may be modified such that two positive acknowledgement/negative acknowledgement (ACK/NACK) responses and two CQI reports are sent. Knowing the channelization code and the scrambling code of the WTRU 110, both cells may be able to receive the information on the HS-DPCCH 1.

Propagation delay between two cells may be different at the WTRU 110. As a result, the WTRU 110 may receive the HS-PDSCH on the supplementary carrier with slight time-offset with respect to the anchor cell reception timing. Therefore, in one alternative, the WTRU 110 may be configured to report a timing difference between the two cells to the UTRAN. The Node B is the instructed to make transmission timing adjustments to time-align reception of the two cells at the WTRU 110. This may be achieved by using existing measurements, e.g., System Frame Number (SFN)-SFN observed time difference, or a new measurement. The measurement may be reported by the WTRU 110 before the supplementary carrier is configured, and/or periodically depending on a configured timer.

In another alternative, the timing between the two cells is not adjusted by the Node-B. In the case where two HS-DPCCHs are configured, the timing of the HS-DPCCH associated with the supplementary carrier follows the same timing relationship as the HS-DPCCH associated to the anchor (serving) cell. This timing restriction allows the WTRU 110 to use the same Discontinuous Transmission (DTX) pattern for both cells.

If the timing between the two cells is not aligned, and the WTRU 110 may be configured to monitor the HS-SCCH on both cells, then the DRX pattern for the supplementary cell may be offset accordingly at the WTRU 110 to make sure it captures the entire downlink transmission. This offset may be calculated and applied autonomously by WTRU 110, or the offset may be calculated by the UTRAN using WTRU measurements.

In another dual-cell implementation, the UTRAN may send the same information over both the anchor and supplementary cells, and thus perform softer handover, if desired in certain channel conditions.

Accordingly, the UTRAN may be configured to send the same physical channel data (i.e. transport block size, modulation and redundancy version) over both cells. This operation is transparent to the physical layer (PHY) of the WTRU 110, in which case the data is received from both cells, processed independently and then sent to the Medium Access Control Layer (MAC). The MAC then performs diversity combining and discards duplicate packets.

In an alternative method, the WTRU 110 may be informed that the UTRAN is initiating softer/soft handovers. The UTRAN may send the same physical data over the two different HS-DSCH channels, and the WTRU 110 may be configured to combine the soft symbols directly at the PHY before storing in the corresponding HARQ buffer. This is achieved, for example, by using a RAKE-type of combining over both carriers, after demodulation, equalization, de-scrambling and de-spreading. As such, the soft data may be combined at the PHY before being sent to the MAC.

In another alternative, the WTRU 110 may be informed that the UTRAN is initiating softer/soft handovers via an HS-SCCH order, or by using a new HS-SCCH type that is defined for cases where soft or softer DC handovers are performed. The data on both cells may be sent to the same HARQ process, or on two independent HARQ processes. The WTRU 110 then uses this information to send HS-DPCCH and to avoid excessive retransmission if one HARQ process received the data successfully prior to the other one. In the case where data is received over two HARQ processes successfully, the MAC has to perform duplicate detection.

In order to facilitate and optimize soft handover in dual-cell operation, the UTRAN may be configured to send two different HS-SCCHs over both cells indicating the same information, except different HARQ processes, if applicable. However, since the information included in the HS-SCCH is identical, and the data being sent is the same, it may be preferable that only one HS-SCCH is sent to indicate the data sent over both cells/carriers. This may be accomplished by only sending the HS-SCCH over the anchor cell to indicate the Transport Block (TB) size/modulation of the HS-DPSCH being sent on both cell/carriers and HARQ process(es) being used for both cells/carriers. Alternatively, the HS-SCCH is sent over the anchor cell to indicate the TB size/modulation of the HS-DPSCH being sent on both cell/carriers and the information of the two HARQ processes being used by the anchor and supplementary cell/carrier. These methods may be performed alone or in combination with one another.

If two HARQ processes are used to send the same data, the HS-SCCH indicates the HARQ processes ID (HID) of each TB using a value, HIDa, provided in the HS-SCCH, which indicates the HARQ process ID (HID) of the anchor cell. The HIDs of the supplementary cell are inferred using a mapping similar to MIMO. More specifically, HIDs of supplementary carrier are given by: (HIDa+Nproc/2) mod (Nproc), where Nproc is the number of HARQ processes configured by higher layers. Alternatively, the HARQ processes are split between the anchor and supplementary cell, such that, the first Nproc/2 are used only by the anchor and the second group is used by the supplementary carrier. The one HID value indicates the HARQ process ID of both groups. In another alternative, two fields are used in the HS-SCCH to indicate the HARQ process ID of the anchor cell and supplementary cell. Each of these alternatives, alone or in combination with one another may be used in the HS-SCCH to indicate the HARQ process ID.

Since the same data is provided in the HS-DPSCH of the two cells, some feedback optimizations may be performed when soft handover is taking place. Accordingly, the WTRU may be configured to generate and send two different HS-DPCCHs for each cell to the Node-B. Alternatively, the WTRU may be configured to generate and send one HS-DPCCH code, but the format of the HS-DPCCH may be altered to include ACK/NACK and CQI information on both cells. In the case where the same HARQ process is used by both cells, the ACK/NACK information provided in the HS-DPCCH is identical for both cells. The Node-B may then combine this information to increase the reliability of the HS-DPCCH information.

If two different HARQ processes are used, then in some cases the data may be successfully received over one cell, but not over the other cell. In this case, if the WTRU 110 is aware that the information is the same on both HARQ processes, the WTRU 110 may send identical information on both HS-DPCCH. The WTRU 110 may be configured to send an ACK over both HS-DPCCH as long as data over one of the HARQ processes receiving the same TB is successfully received and the WTRU 110 may be configured to send a NACK if data over both HARQ processes is not successfully received.

The Node-B may perform soft combining of the ACK/NACK information to increase the reliability of the received feedback.

Alternatively, the WTRU 110 may be configured to report ACK/NACK information independently. If data failed on the given HARQ process, a NACK is sent even though the other HARQ processes successfully received the data. However, since the Node-B is aware that the same information was sent over both cells, the Node-B may consider the data to be successfully sent as long as one ACK is received from both HS-DPCCH.

In another alternative, when the WTRU 110 is aware that a soft handover is taking place, only one HS-DPCCH is sent over the anchor cell, including the feedback information of both cells. If at least one HARQ process received the packet successfully an ACK is sent, otherwise if both HARQ processes failed a NACK is sent.

Although the invention is described within the context of 3GPP WCDMA systems, it may be understood that it is applicable to any wireless communications system that supports dual or multi-cell operation.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for a multi-carrier wireless transmit receive unit (WTRU) comprising:
   determining that the WTRU is configured to receive downlink communications via a plurality of cells using a single carrier frequency;

receiving downlink communications from the plurality of cells via the single carrier frequency, wherein the plurality of cells includes an anchor cell and a supplementary cell associated with a single Node B;

receiving a signal from one or more of the plurality of cells via the single carrier frequency; and performing a mobility procedure on one of the plurality of cells based on the received signal from the one or more of the plurality of cells via the single carrier frequency, wherein the mobility procedure comprises changing one of the plurality of cells from which the downlink communications are received via the single carrier frequency.

2. The method of claim 1, wherein the performing mobility procedure comprises performing a change in a frequency on the anchor cell and the supplementary cell simultaneously.

3. The method of claim 1, wherein the performing mobility procedure comprises:

detecting that a quality of a neighboring supplementary cell associated with the single carrier frequency is better than a quality of the supplementary cell; and sending a measurement report indicating the detection of the quality of the neighboring supplementary cell.

4. The method of claim 1, wherein the performing mobility procedure comprises performing a supplementary cell handover.

5. The method of claim 1, wherein the performing mobility procedure comprises handing over to a second anchor cell.

6. The method of claim 1, wherein the received signal from the plurality of cells is associated with the anchor cell or the supplementary cell.

7. The method of claim 1, comprising determining a time difference between the downlink communications received from the plurality of cells via the single carrier frequency.

8. The method of claim 1, wherein the anchor cell is associated with a first sector of the single Node B and the supplementary cell is associated with a second sector of the single Node B.

9. The method of claim 3, wherein the detecting is performed based on a comparison of a signal level of the supplementary cell or the quality of the supplementary cell with a threshold.

10. The method of claim 5, wherein the handing over comprises maintaining a connection with the supplementary cell while establishing synchronization and physical channels in the second anchor cell.

11. The method of claim 7, wherein the performing mobility procedure comprises:

receiving a discontinuous reception (DRX) pattern associated with the anchor cell; and offsetting a DRX pattern associated with the supplementary cell from the DRX pattern associated with the anchor cell by the time difference between the downlink communications to receive the downlink communications from the supplementary cell.

12. The method of claim 7, wherein the determining is performed by comparing frequency information associated with the anchor cell and frequency information associated with the supplementary cell.

13. The method of claim 8, wherein the performing mobility procedure comprises taking measurements from a neighboring cell within a sector other than the first sector associated with the anchor cell and the second sector associated with the supplementary cell.

14. The method of claim 10, wherein the handing over comprises establishing a second supplementary cell once the second anchor cell has been established if the supplementary cell is used as the second anchor cell.

15. The method of claim 13, wherein the taking measurements from the neighboring cell is triggered based on a comparison of a common pilot channel (CPCH) signal quality of the anchor cell or the supplementary cell with a threshold.

16. The method of claim 13, comprising reporting the measurements from the neighboring cell.

17. A multi-carrier wireless transmit receive unit (WTRU) comprising:

a processor configured to:

determining that the WTRU is configured for receiving downlink communications via a plurality of cells using a single carrier frequency;

a receiver configured to receive downlink communications from the plurality of cells via the single carrier frequency, wherein the plurality of cells includes an anchor cell and a supplementary cell associated with a single Node B;

the processor configured to:

receive a signal from one or more of the plurality of cells via the single carrier frequency; and perform mobility procedure on one of the plurality of cells based on the received signal from the one or more of the plurality of cells via the single carrier frequency, wherein the mobility procedure comprises changing one of the plurality of cells from which the downlink communications are received via the single carrier frequency.

18. The WTRU of claim 17, wherein the received signal from the plurality of cells is associated with the anchor cell or the supplementary cell.

19. The WTRU of claim 17, wherein the processor being configured to perform the mobility procedure comprises the processor being configured to perform a change in a frequency on the anchor cell and the supplementary cell simultaneously.

20. The WTRU of claim 17, wherein the processor being configured to perform the mobility procedure comprises the processor being configured to:

detect that a quality of a neighboring supplementary cell associated with the single carrier frequency is better than a quality of the supplementary cell; and send a measurement report indicating the detection of the quality of the neighboring supplementary cell.

21. The WTRU of claim 17, wherein the processor is configured to determine a time difference between the downlink communications received from the plurality of cells via the single carrier frequency.

22. The WTRU of claim 17, wherein the processor being configured to perform the mobility procedure comprises the processor being configured to perform a supplementary cell handover.

23. The WTRU of claim 17, wherein the processor being configured to perform the mobility procedure comprises the processor being configured to perform a handover to a second anchor cell.

24. The WTRU of claim 17, wherein the anchor cell is associated with a first sector of the single Node B and the supplementary cell is associated with a second sector of the single Node B.

25. The WTRU of claim 20, wherein the processor is configured to perform the detection based on a comparison of a signal level of the supplementary cell or the quality of the supplementary cell with a threshold.

26. The WTRU of claim 21, wherein the processor being configured to perform the mobility procedure comprises the processor being configured to:
receive a discontinuous reception (DRX) pattern associated with the anchor cell; and
offset a DRX pattern associated with the supplementary cell from the DRX pattern associated with the anchor cell by the time difference between the downlink communications to receive the downlink communications from the supplementary cell.

27. The WTRU of claim 21, wherein the processor being configured to determine the time difference includes the processor being configured to compare frequency information associated with the anchor cell and frequency information associated with the supplementary cell.

28. The WTRU of claim 23, wherein the processor being configured to perform the handover comprises the processor being configured to maintain a connection with the supplementary cell while establishing synchronization and physical channels in the second anchor cell.

29. The WTRU of claim 24, wherein the processor being configured to perform the mobility procedure comprises the processor being configured to take measurements from a neighboring cell within a sector other than the first sector associated with the anchor cell and the second sector associated with the supplementary cell.

30. The WTRU of claim 28, wherein the processor being configured to perform the handover comprises the processor being configured to establish a second supplementary cell once the second anchor cell has been established if the supplementary cell is used as the second anchor cell.

31. The WTRU of claim 29, wherein the processor is configured to trigger the measurements being taken from the neighboring cell based on a comparison of a common pilot channel (CPCH) signal quality of the anchor cell or the supplementary cell with a threshold.

32. The WTRU of claim 29, wherein the processor is configured to report the measurements from the neighboring cell.

* * * * *